3,092,457
METHOD FOR PREPARING HIGH SURFACE
AREA TITANIA
James W. Sprague, Streetsboro, Ohio, assignor to The
Standard Oil Company, Cleveland, Ohio, a corporation
of Ohio
No Drawing. Filed Nov. 4, 1960, Ser. No. 67,162
2 Claims. (Cl. 23—202)

The present invention is an improvement in the preparation of a pure titania gel of the anatase modification useful as a catalyst, a catalyst carrier, or an adsorbent. The literature reveals no method for preparing a high surface area titania of the anatase modification sufficiently free of contaminants for various catalytic uses. This invention then comprises the first and essential step of acetolysis followed by the step of hydrolysis of a titanic acid ester in which the alkyl chain is $C_1$ to $C_4$. Tetraisopropyl titanate is a typical titanic acid ester and is of such a nature that its organic portion, if it occludes to the gel, is readily removed by calcination in forming high surface area-titanium dioxide.

A titania gel of a high degree of purity is essential for many purposes. Even trace amounts of impurities may seriously affect adsorptive and catalytic efficiencies. In addition, a high degree of porosity is necessary in order that a larger surface area per unit weight of material may be presented for adsorption or catalysis. Although there are catalytic mixtures containing titania that exhibit a large surface area, the high porosity of these composite catalytic mixtures derives from the presence of other components. There has been no method for preparing a titania gel catalyst of high purity and a satisfactorily large surface area.

This invention produces a titania gel substantially free of impurities. The impurities are less than 0.01% of copper, magnesium, aluminum, calcium, tin, zinc, and zirconium and 0.01 to 0.1% of silicon and iron. This titania gel also has a reasonably high surface area ranging from 75 to 125 $m.^2/g$. Its chemical intermediates which may occlude to the gel are completely removed by calcination. Furthermore, this titania gel is of the anatase modification. X-ray analysis shows that the lines in the spectra agree with the ASTM reference for anatase. There is no evidence of rutile being present, in fact, the peak area to background ratio suggests that the gel is essentially anatase.

The method of this invention comprises reacting tetraisoalkyl titanate with glacial acetic acid to achieve acetolysis, hydrolyzing with water and calcining. The exact nature of the reaction has not been ascertained; however, an evolution of heat occurs on mixing that is of such a magnitude as to indicate that a chemical reaction takes place. Further, the odor of isopropyl acetate emanates from the freshly hydrolyzed mixture but not from the acetolyzed mixture. A mixture of isopropanol and acetic acid does not form the ester as readily.

The following is the best mode contemplated for carrying out the invention:

NOVEL PROCEDURE OF THIS INVENTION 285 grams (1 mole) of tetraisopropyl titanate is added to 240 ml. (4 moles) of glacial acetic acid at 26° C. In less than one minute the temperature is 61° C. indicating the thermal effect of the reaction. This solution is cooled to −10° C. and then added with vigorous stirring to 814 mls. of water (or 2.86 ml. of water for each gram of the tetraisopropyl titanate). The water is precooled to 0° C. The temperature of the water must be such that the final mixture is in the range of 5 to 25° C. The initial degree, precooling the water to produce this temperature in finally cooled water, will depend on a number of factors; the ambient temperature, the heat capacity of the equipment, etc. After mixing, the temperaure of the clear sol is 10° C. (50° F.). The sol is allowed to stand for 48 hours at room temperature, during which time gelation occurs. The gel is dried at 180° F. for 64 hours.

The dried gel is calcined in a stream of air (4 cu. ft./hr.) in the range of 950° to 1250° F. for about 3 minutes and cooled rapidly to 500° F. The gel is held at a temperature of 500° F. for 13 hours, raised to 950°–990° F. over a period of 6 hours and maintained there for 3 hours. The calcined gel is cooled rapidly and is ground to a particle size of −20 +80 mesh.

This material has the following properties:

Bulk density _____ g./ml __ 1.2
Pure volume _____ ml./g __ 0.3
Surface area _____ $m.^2/g$ __ 126

When the procedure using the critical step of acetolysis before hydrolysis is repeated over a range of conditions and temperatures, i.e., standing at room temperature, slight heat or extraction with chloroform to induce gelation, all methods are successful. Table I illustrates that satisfactorily high surface areas are obtained regardless of the variations, so long as acetolysis occurs before hydrolysis.

Table I

TITANIA GEL PREPARATIONS

| Run | $T_1$, ° C. | $T_2$, ° C. | $T_3$, ° C. | Extraction Media | Area, $m.^2/g$. |
|---|---|---|---|---|---|
| 1350-51 | 20 | 20 | 36 | $CHCl_3$ | 90 |
| 1350-71A | −40 | 0 | −1 | $CHCl_3$ | 77 |
| 1350-71B | −40 | 0 | −1 | None | 87 |
| 1350-72A | −10 | 0 | 10 | $CHCl_3$ | 80 |
| 1350-72B | −10 | 0 | 10 | None | 126 |

$T_1$—Temperature of tetraisopropyl titanate-glacial acetic acid mixture before hydrolysis.
$T_2$—Temperature of precooled water before hydrolysis.
$T_3$—Equilibrium temperature of clear sol after hydrolysis.

Desirable limits may be given for the operation variables as long as acetolysis occurs first. The molar ratio of glacial acetic acid to tetraisopropyl titanate may vary from 1 to 8; the preferred range is 3 to 5 moles of acetic acid per mole of titanic acid ester. Other low molecular weight organic esters of titanic acid may be utilized, such as lower alkyl esters in which the alkyl radical has 1 to 4 carbon atoms, but the tetraisopropyl ester is preferred because of its low cost and availability. The initial temperature of the tetraisopropyl titanate and acetic acid may vary from −50° C. to 30° C.; the preferred range is −15° C. to 15° C. The operable range of temperature of water for hydrolysis is limited on the lower end to 0° C. and may go to 30° C. A slight degree of precooling of the water to be used for hydrolysis is preferred in order to obtain the final mixture in the range of 5° C. to 25° C.

In contrast with results achieved by the above described process if an ordinary organic titanate is merely hydrolyzed or if titanium tetracetate is hydrolyzed, the same results are not achieved.

CONVENTIONAL PREPARATION

An ordinary organic ester of titanic acid, such as tetraisopropyl titanate, is used because the organic portion of the acid is easily removed by calcining. 113 grams of tetraisopropyl titanate are mixed with 360 ml. of normal propanol and 360 ml. of water to form a slurry in which a precipitate of titania is formed. The precipitate is filtered and dried for 16 hours at 200° F. This material when pelleted with 15 grams of hydrogenated vegetable fat and calcined has the following properties:

Pure volume (by $H_2O$ titration) _____ ml./g __ 0.2
Bulk density _____ g./ml __ 1.6
Surface area _____ $m.^2/g$ __ 15

Thus, the simple hydrolysis of a titanic acid ester without the step of acetolysis produces a titania gel, but it has an unsatisfactorily low surface area.

HYDROLYSIS OF TITANIUH TETRACETATE

It might be presumed that the simple hydrolysis of titanium tetracetate would achieve the same result as the acetolysis of a titanic acid ester followed by hydrolysis. This, however, is not the case. For example, 540 ml. (9 moles) of glacial acetic acid are placed in a one liter 3-necked round-bottom flask, equipped with a reflux condenser and a dropping funnel, and heated to 90° C. 190 grams (one mole) of titanium tetrachloride is added dropwise over a 2-hour period so as to maintain a gentle reflux. Crystals separate when about half of the titanium tetrachloride is added. The mixture is allowed to stand for 64 hours at room temperature. The titanium tetracetate crystals are filtered and dried over soda-lime for several days. The titanium tetracetate crystals (180 grams) are added to water (1010 ml.) with rigorous stirring. The water is precooled to 10° C. but rises to 19° C. and a clear sol is formed. A portion of the sol is heated to 70° C. and becomes cloudy but clarifies at 100° C. The addition of isopropanol, whether to the heated or to the unheated portion, fails to induce precipitation or gelation. Chloroform extraction fails to produce gelation. Maintaining the clear sol at room temperature for several days results in no precipitation or gelation. It is obvious then that the hydrolysis of titanium tetracetate is not the equivalent of the novel method of this invention which requires the step of acetolysis prior to hydrolysis and calcination.

I claim:
1. A method for preparing a high surface area pure titania gel comprising the step of acetolyzing a titanic acid ester having an alkyl chain of 1 to 4 carbon atoms with 1 to 8 mols of glacial acetic acid per mole of ester, hydrolyzing the resulting product with water at a temperature so as to obtain a final mixture in the range of 5° to 25° C., drying the gel, and calcining the dry gel in air at 950° to 1250° F., and then cooling the same.
2. In the method of claim 1, the titanic acid ester is tetraisopropyl titanate.

References Cited in the file of this patent

UNITED STATES PATENTS

| | | |
|---|---|---|
| 1,682,242 | Patrick | Aug. 28, 1928 |
| 2,553,402 | Connolly | May 15, 1951 |
| 2,584,286 | Pieree et al. | Feb. 5, 1952 |

OTHER REFERENCES

Barksdale book on "Titanium," 1949 ed., page 66, The Ronald Press Co., N.Y.